United States Patent [19]

Herchenbach et al.

[11] Patent Number: 4,891,007
[45] Date of Patent: * Jan. 2, 1990

[54] METHOD AND APPARATUS FOR THE MANUFACTURE OF CEMENT FROM RAW CEMENT MEAL

[75] Inventors: Horst Herchenbach, St. Johann; Albrecht Wolter; Fritz Rodenhäuser, both of Köln, all of Fed. Rep. of Germany

[73] Assignee: Klockner-Humboldt-Deutz Aktiengesellschaft, Fed. Rep. of Germany

[*] Notice: The portion of the term of this patent subsequent to May 31, 2005 has been disclaimed.

[21] Appl. No.: 151,915

[22] Filed: Feb. 3, 1988

Related U.S. Application Data

[63] Continuation-in-part of Ser. No. 925,273, Oct. 31, 1986, Pat. No. 4,747,879.

[30] Foreign Application Priority Data

Feb. 6, 1987 [DE] Fed. Rep. of Germany ....... 3703596

[51] Int. Cl.$^4$ ............................................. F27B 15/00
[52] U.S. Cl. ......................................... 432/14; 432/58; 432/106
[58] Field of Search ............................ 432/14, 106, 58

[56] References Cited

U.S. PATENT DOCUMENTS

| | | | |
|---|---|---|---|
| 4,211,573 | 7/1980 | Abelitis | 106/100 |
| 4,299,564 | 11/1981 | Herchenbach et al. | 432/106 |
| 4,315,734 | 2/1982 | Ramesohl et al. | 432/106 |
| 4,363,668 | 12/1982 | Herchenbach | 106/100 |
| 4,370,127 | 1/1983 | Abelitis | 432/106 |
| 4,386,906 | 6/1983 | Dano | 432/14 |
| 4,402,667 | 9/1983 | Goldmann | 432/14 |
| 4,504,319 | 3/1985 | Wolter et al. | 106/100 |
| 4,514,170 | 4/1985 | Kupper | 432/14 |
| 4,561,842 | 12/1985 | Nielsen | 432/106 |
| 4,568,276 | 2/1986 | Fujisawa | 106/100 |
| 4,747,879 | 5/1988 | Wolter et al. | 432/106 |

FOREIGN PATENT DOCUMENTS 3333705 4/1985 Fed. Rep. of Germany .

Primary Examiner—Henry C. Yuen
Attorney, Agent, or Firm—Hill, Van Santen, Steadman & Simpson

[57] ABSTRACT

A method and apparatus for the manufacture of cement from raw cement meal wherein the meal passes through a series of preheating cyclones, through a calcining zone, through a rotary sintering furnace and to a cooler with the flow of meal from a penultimate cyclone heat exchanger divided into subflows with one chamber receiving air from the cooler and also receiving burning fuels that are extremely difficult to burn and both calcining chambers delivering meal to the last heat exchanger for delivery to the furnace.

16 Claims, 1 Drawing Sheet

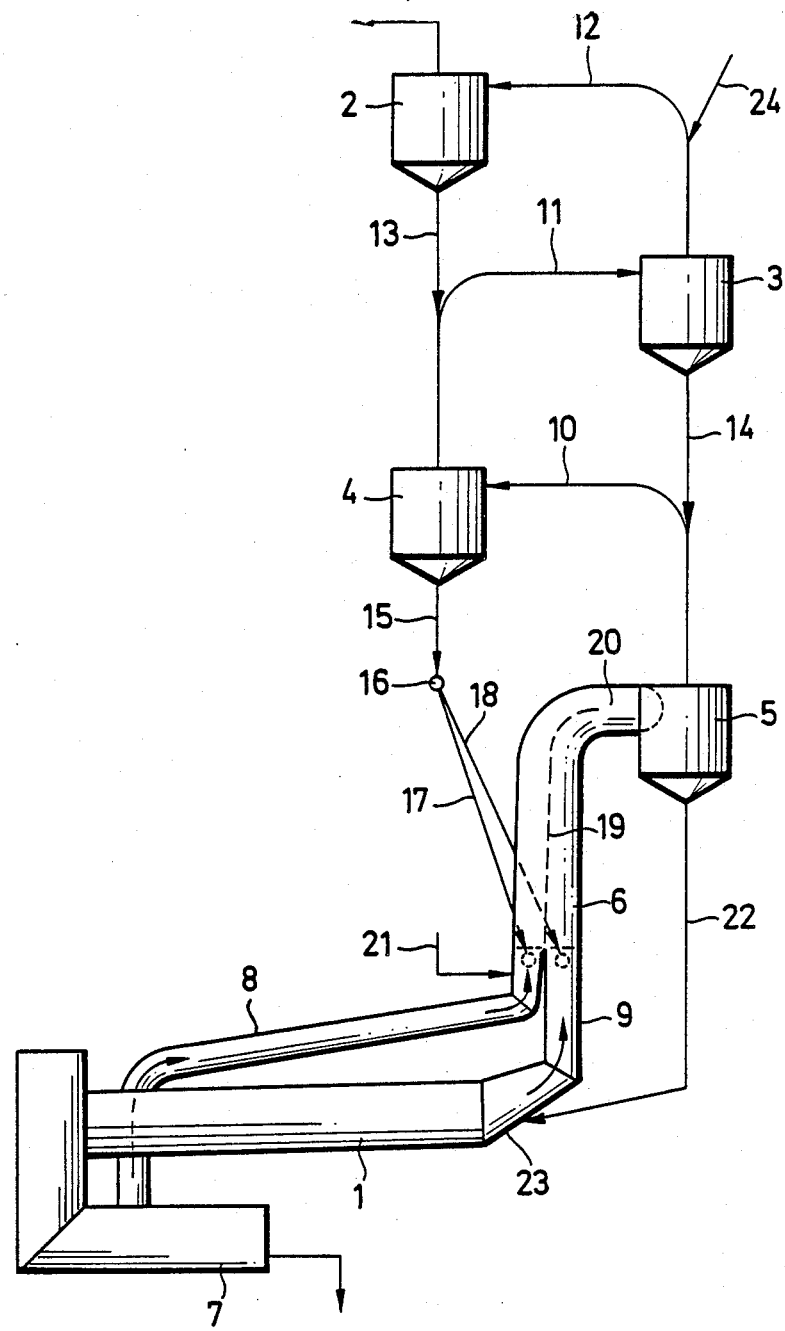

METHOD AND APPARATUS FOR THE MANUFACTURE OF CEMENT FROM RAW CEMENT MEAL

The present application is a continuation-in-part of the application, Ser. No. 925,273, Wolter and Herchenbach, filed Oct. 31, 1986 and issued as U.S. Pat. No. 4,747,879 on May 31, 1988.

BACKGROUND OF THE INVENTION

The invention relates to methods and apparatus for the manufacture of cement from raw cement meal and particularly wherein the process includes preheating with a series of cyclones, calcining in a calcining and sintering in a rotary furnace and thereafter cooling.

In German published application No. 33 33 705, there is disclosed a method and apparatus for the manufacture of cement clinker low in harmful substances, particularly in alkali. In the structure disclosed therein, the preheated raw meal is divided into two substreams where one substream is introduced into the exhaust gas stream from the rotary tubular kiln and the other substream is introduced into the exhaust air stream of the clinker cooler and the substreams are calcined. The calcined substreams are thereafter introduced into the lowest cyclone separator and combined to form a single suspension gas stream and thereafter are separated from the exhaust gases in the last cyclone separator. In this manner, the performance capability of the calcining unit as well as its adaptability to different calcination behavior, dependent on the properties of the meal, such as the agglomeration behavior of the preheated raw meal, are improved.

In accordance with the method employed for the thermal treatment of raw meal for the manufacture of cement, the preheated raw cement meal is divided into two substreams before calcination. These substreams are exposed to the exhaust air from the coolers and to the kiln exhaust gases. The substreams are conducted through the calcination zone parallel to one another. The subsequent joining and the parallel guidance of the two gas streams intermixed with the preheated raw meal occurs with the two substreams with meal being conducted through the calcinator at substantially identical gas velocity. Upon exiting from the calcinator, only a partial mixing occurs at the boundary layer of the two gas streams. This method is utilized because of its capability to largely prevent the inhibition effect of the evaporating alkalies on the burn-out of the fuels introduced at the calcination stage and this is intended to noticeably reduce the $NO_x$ portion in the kiln exhaust gas.

An object of the invention is to utilize the foregoing method, employing the advantageous results thereof and to provide a method and apparatus enabling the employment of fuels that are extremely difficult to burn for calcining the preheated raw meal in the manufacture of cement and utilizing an optimum exploitation of the thermal energy present in the fuel.

A further object of the invention is to provide an improved method and apparatus for the manufacture of cement from meal which has overall advantages in improved performance, quality, control and throughput utilizing fuels which are difficult to burn which may be otherwise termed as low grade fuels.

FEATURES OF THE INVENTION

In accordance with the principles of the invention, the foregoing objects are achieved in taking a portion of the preheated raw meal and heating up this portion with the assistance of fuels that are extremely difficult to burn. This portion is heated up to a temperature required for the complete combustion of such fuels before the portion is mixed with the other portion of the raw meal. The meal is divided into two substreams with one portion being heated with the assistance of such subgrade difficult to burn fuels. The complete thermal energy of such fuels that are extremely difficult to burn is utilized and such fuels include anthracite, oil, coke, graphite and the like. These fuels can be used in this method of calcining without running the risk that the calcination process deteriorates or is substandard. The temperature that is required for the complete combustion of fuels utilizing an appropriate quantitative adaption of the substream of raw meal, lies far above the standard calcination temperature of 900° C. so that a complete combustion of the fuel that is extremely difficult to burn is utilized and is guaranteed.

In accordance with the principles of the invention, the heating of the preheated substream of raw material which burns the low grade or difficult to burn fuel is carried to a temperature below the ash melting point. A complete burning of the fuel is thereby reliably achieved and coagulations of solids are avoided.

In accordance with the invention, the division of the preheated raw material is quantitatively carried out dependent on the temperature of the ash melting point. In this way, the quantity of fuel required for the preheating and calcination of the raw cement meal can be kept substantially constant.

Other advantages, objects, features and details of the invention will become more apparent with the teachings of the principles thereof in connection with the disclosure of the preferred embodiments in the specification, claims and drawing, in which:

DESCRIPTION OF THE DRAWINGS

FIG. 1 which is the only figure of the drawing, is an elevational schematic view of apparatus constructed and arranged for operating in accordance with the principles of the invention.

DESCRIPTION

As illustrated in the drawing, the apparatus includes a rotary tubular kiln 1. In advance of the kiln are a series of preceding cyclone heat exchangers 2, 3, 4 and 5. The sequence of apparatus for treating the meal includes a calciner 6. Following the tubular furnace or kiln 1, is a cooler 7. In sequence the raw meal passes through cyclone heat exchangers 2, 3 and 4, then through the calciner 6, thereupon through the last heat exchanger 5, into the rotary furnace 1 and then through the cooler 7.

The clinker cooler 7 is provided with an exhaust gas or air conduit 8 which leads up into the calciner 6.

Also leading into the calciner 6 is an exhaust gas conduit 9 which leads from the rotary tubular kiln.

The calciner 6 is a vertically arranged chamber extending upwardly and is located between the next to the last, or penultimate, cyclone separator 4 and the last cyclone separator 5 of the preheating cyclones. The cyclone separators are in communication with each other. Cyclone separators 2, 3, 4 and 5 are in communication with each other respectively via gas conduits 12, 11, and 10. Raw material is first supplied to the first cyclone 2 through a raw material delivery conduit 24. Raw meal conduits lead between the successive separators with conduits 13, 14 and 15 leading respectively from the series of preheater cyclones 2, 3, 4 and 5.

The raw meal discharge conduit 15 from the penultimate cyclone separator 4 is provided with a metering valve or shunt 16. The metering valve discharges into two divider branch lines 17 and 18 which respectively lead into first and second chambers of the calcinator 6 shown respectively at the left and right of the calcinator 6. The left and right chambers are divided by a vertical dividing or separating wall 19. This wall leads upwardly to follow the bend of the calciner 6. The vertical wall 19 terminates just prior to the last cyclone heat exchanger 5. However, in some instances, it may be desirable to have the dividing wall 19 extend completely to the last cyclone heat exchanger 5 so that the calciner chambers are separated all the way up to the heat exchanger 5 thus insuring that the gas flows in the two adjoining calciner chambers will remain separated and will mix only in the preheater cyclone 5.

A conduit 21 for fuel delivery is connected to the cooler exhaust air conduit 8 below the raw cement meal input. The fuel inlet 21 is adapted for the introduction of the low grade hard to burn fuels which will burn during their ascent through the first calciner chamber of the calcining zone 6.

After the divided flows of meal have passed upwardly in their respective calcining chambers and are mixed in the preheater 5, the meal is discharged through the line 22 to pass down to the kiln admission head 23 of the rotary furnace 1.

During operation of the mechanism, raw cement meal is introduced into the exhaust gas conduit 12 by the raw meal supply conduit 24. The meal proceeds through the preheater separators 2 and 3 to the preheater cyclone separator 4. Upon flowing out of the preheater separator 4, the raw cement meal is separated into first and second subflows respectively through the lines 17 and 18 to enter into the entry opening shown by the dotted line circles at the base of the calciner 6.

The first substream flowing down through the line 17 is picked up and mixed with the upward flow of air coming from the cooler exhaust air conduit 8 and mixing with the fuel from the fuel inlet 21.

The other substream of raw meal enters the second chamber of the calciner 6 through the dotted line opening shown at the base of the line 18 and is mixed and entrained with the exhaust gas flowing upwardly from the rotary furnace, flowing through line 9.

Both substreams of raw meal are upwardly entrained by the air and gas flows and are calcined and are discharged into the cyclone separator 5.

The calciner 6 is constructed to allow for the vertical ascent of the subflows of meal separated from each other. The subflow flowing upwardly in the first or left chamber is heated by the hard to burn fuels to a high temperature substantially in excess of 900° C. and below the ash melting point of the meal. The thermal transfer of energy occurs through the wall 19 with the high temperatures encountered in the first calcining chamber which heat the wall and the meal in the second calcining chamber picks up heat due to flow contact with the wall 19.

The apportioning valve 16 effects a quantitative division of the preheated raw meal which is a function of or dependent upon the ash melting point temperature of the fuel and meal. With the arrangement used, the delivery of fuels difficult to burn through the inlet 21 is controlled and maintained relatively quantitatively constant. The calcining of the meal in the first chamber occurs due to the heating of fuel, and the calcining of the meal in the right chamber of the calciner occurs first due to the heat transfer from the wall and second due to mixing with the meal from the first chamber after the two flows are past the divider walls 19. This occurs primarily in the last cyclone 5 where the gases carrying the meal mix relatively thoroughly. Thereby, a nearly complete calcination of both substreams of raw cement meal is achieved in a simple especially heat economical fashion. The mixed substreams of calcined meal are then flowed into the rotary furnace and subjected to the sintering process.

As stated, an anticipated modification of the structure shown includes extending the partition 19 to have its upper end extend directly to the wall of the cyclone separator 5 and be connected thereto so that both gas streams are conducted separately from one another through the entire flow through the calciner, but also flow into the cyclone separator separated from each other and are only mixed with one another therein. There is also the possibility of controlling the quantitative division of the raw material raw cement meal in the branch lines 17 and 18. This can be controlled dependent on the temperature of the cooler exhaust air which is heated in the calciner 6. It is also contemplated that a portion of the hot kiln exhaust gases from the kiln exhaust can be withdrawn and controlled in their flow up through the conduit 9 in order to eliminate the possibility of introduction of injurious substances into the system.

Thus, it will be seen there has been provided an improved method and apparatus for the manufacture of cement from the raw cement meal which achieves the advantages above set forth and provides a simple direct procedure and apparatus for the manufacture of cement.

We claim as our invention:

1. An apparatus for the manufacture of cement from raw meal comprising in combination:
    a plurality of cyclone heat exchangers adapted to receive and preheat raw meal;
    a rotary sintering furnace connected to receive meal from the last of said heat exchangers;
    a cooler connected to receive meal from said furnace;
    a calcining chamber divided to include first and second calcining zones to receive divided flow of meal from a penultimate of said heat exchangers and to deliver meal to said last exchanger;
    a flow apportioning valve between said penultimate heat exchanger and said calcining chamber dividing the flow from the heat exchanger into subflows to flow respectively into said first and second calcining means;
    means conducting air from said cooler into the first calcining zone to mix with a first subflow of meal;
    means conducting gas from the furnace into the second calcining zone to mix with a second flow of meal; and
    fuel delivery means in said first calcining zone delivering a quantity of difficult to burn fuel heating the zone to temperatures sufficient to cause the substantial complete combustion of said fuel.

2. An apparatus for the manufacture of cement from raw meal constructed in accordance with claim 1:

wherein said flow apportioning valve is controllable to vary the apportionment of amounts of meal between said first and second calcining zone.

3. An apparatus for the manufacture of cement from raw meal constructed in accordance with claim 1:
including a vertical dividing wall separating said first and second calcining zones.

4. An apparatus for the manufacture of cement from raw meal constructed in accordance with claim 3:
wherein said dividing wall conducts heat from said first zone to said second zone to transfer heat energy generated by said fuel to the meal in said second zone.

5. An apparatus for the manufacture of cement from raw meal constructed in accordance with claim 3:
wherein said wall extends to said last calcining chamber.

6. An apparatus for the manufacture of cement from raw meal constructed in accordance with claim 1:
wherein said fuel delivery means is connected to deliver fuel upstream from the entry of meal from the penultimate heat exchanger into the first calcining zone.

7. The method of manufacturing cement from raw cement meal comprising the steps:
preheating raw cement meal in a plurality of cyclone heat exchangers;
passing the meal from the last of the heat exchangers to a rotary sintering furnace;
cooling the meal in the cooler as it is received from the furnace;
dividing the flow of meal from a penultimate of the heat exchangers in a calcining chamber provided to include first and second calcining zones and delivering meal to the last exchanger;
dividing the flow from the penultimate heat exchanger into streams to flow into the first and second calcining zones;
conducting air from the cooler into the first calcining zone to mix with the first substream of meal;
conducting gas from the furnace into the second calcining zone to mix with a second stream of meal; and
delivering fuel of a quantity difficult to burn into the first calcining zone and heating the zone to a temperature sufficient to cause a substantial complete combustion of the fuel.

8. The method of manufacturing cement from raw meal in accordance with the steps of claim 7, characterized in that the heating of said one substream of raw meal occurs up to a temperature below the ash melting point for the burning of said fuel.

9. The method of manufacturing cement from raw meal in accordance with the steps of claim 7, wherein the division of raw meal into subflows is a function of the attainment of a temperature of said one subflow dependent upon the ash melting point temperature of said fuel.

10. The method of manufacturing cement from raw cement meal comprising the steps of claim 7:
including dividing said substream flows from each other a substantial distance while calcining the flows.

11. The method of manufacturing cement from raw cement meal comprising the steps of claim 7:
including maintaining said substream flows parallel while calcining and transferring heat energy from said one substream to the other substream while calcining.

12. The method of manufacturing cement from raw cement meal comprising the steps of claim 7:
including dividing and maintaining said substream flows separate while calcining up to said last exchanger.

13. The method of manufacturing cement from raw cement meal comprising the steps of claim 7:
including controlling the division of said substream flows to control the quantity of meal fed to each flow.

14. The method of manufacturing cement from raw cement meal comprising the steps of claim 7:
including heating said one substream flow in the calcining zone to a temperature substantially over 900° C.

15. The method of manufacturing cement from raw cement meal in accordance with the steps of claim 7:
wherein fuel is delivered to said first calcining zone upstream from the flow of meal from the penultimate heat exchanger into the first calcining zone.

16. An apparatus for the manufacture of cement from raw meal comprising in combination:
a rotary tubular kiln;
a series of cyclone heat exchangers;
means defining a calcining zone located between heat exchangers preceding the tubular kiln;
a cooler connected to receive meal from the kiln;
an exhaust air conduit from the cooler leading to the calcining zone;
an exhaust gas conduit leading from the rotary kiln to the calcining zone, said calcining zone providing vertical parallel calcining zone chambers located between the penultimate and last cyclone heat exchangers delivering meal to the kiln with said air conduit leading to one chamber and the gas conduit leading to the other chamber;
a metering valve connected between the penultimate cyclone separator having branch lines leading to said calcining chamber; and
a fuel delivery conduit leading to the calciner chamber receiving the cooler exhaust air for delivery of a low grade hard to burn fuel.

* * * * *